No. 882,837. PATENTED MAR. 24, 1908.
M. NORTON.
TOE WEIGHT.
APPLICATION FILED JULY 29, 1907.

Witnesses
Inventor
Miles Norton
By
Attorneys

UNITED STATES PATENT OFFICE.

MILES NORTON, OF CLEVELAND, OHIO.

TOE-WEIGHT.

No. 882,837.  Specification of Letters Patent.  Patented March 24, 1908.

Application filed July 29, 1907. Serial No. 385,991.

*To all whom it may concern:*

Be it known that I, MILES NORTON, a citizen of the United States, residing at Cleveland, in the county of Cuyahoga and State of Ohio, have invented certain new and useful Improvements in Toe-Weights, of which the following is a specification.

This invention relates to toe weights for horses, and has for its object to provide a weight which can be readily applied and removed, and the device includes a keeper or attaching part which is permanently fastened to the hoof and to which weights of any size can be quickly applied or removed whenever necessary.

The invention is illustrated in the accompanying drawings, in which

Figure 1:
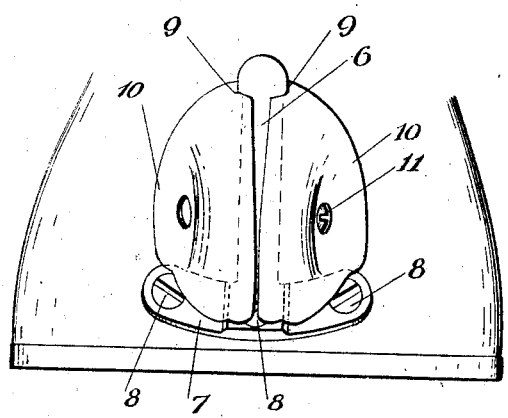
Figure 3:
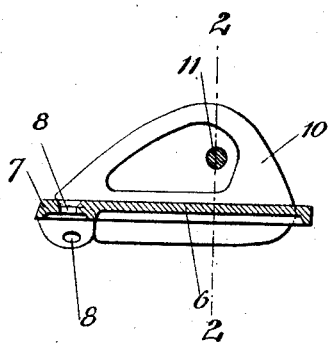
Figure 2:
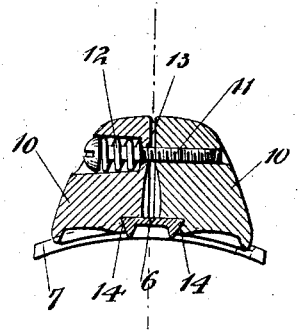

Figure 1 is a front view of the weight, applied. Fig. 2 is a cross section on the line 2—2 of Fig. 3. Fig. 3 is a central longitudinal section.

The keeper or attaching piece comprises an inverted T-shaped member or piece of light metal, preferably aluminium, which has a stem 6 projecting from a cross piece 7 at the bottom. The cross piece 7 is curved to conform to the shape of the front of the hoof to which it is attached by screws 8. The stem 6 is dovetailed or flared in cross section, with the wide part out, and extends vertically up in front of the hoof and has shoulders 9 at the top.

The weight is made in two halves 10 which are separate from each other and are connected together by a screw 11. The part which receives the head of the screw is counter-bored in order to seat a spring 12 under the head of the screw, and at the top of the meeting line between the two halves they are slightly recessed as indicated at 13 to allow for the insertion of the end of a screw-driver or other blade. The halves are rabbeted on the inside to form a dovetailed groove 14 of proper size and shape to fit over the stem 6.

The spring 12 allows the halves of the weight to be separated to a sufficient extent to permit their engagement with or disengagement from the stem 6. In other words, the halves may be pulled or forced apart to increase the width of the groove and thereby allow the weight to be slipped on or off the stem. The weight may be placed on the stem by forcing the same downwardly over the end thereof, and the halves will spread apart a sufficient distance to slip over the shoulders at the top of the stem, and after they pass the same the spring will cause them to snap together on the dovetailed part of the stem. To remove the weight, a screw-driver or other blade may be inserted in the recess between the halves and given a turn which will spread the halves apart and allow the weight to be slipped off. Obviously weights of different sizes may thus be easily and readily applied or substituted. Or the weights may be entirely removed, leaving the light keeper on the hoof permanently. Therefore to apply or remove the weights it is unnecessary to insert or take out any screws, and the pressure of the spring on the screw which connects the halves will tend to bind said screw and obviate any tendency of the same to loosen and fall out.

I claim:

1. A toe weight comprising an attaching member adapted to be fixed to the hoof and having an undercut stem, a pair of weight sections having a dovetailed groove which receives said stem, a screw connecting said sections, and a spring between the screw and one section and arranged to hold said sections yieldingly together.

2. A toe weight comprising an attaching member having a cross piece at the bottom adapted to be fixed to the hoof and an upwardly extending undercut stem with shoulders at the top, and a pair of weight sections having a spring connection and an undercut groove adapted to receive said stem.

In testimony whereof I have affixed my signature, in presence of two witnesses.

MILES NORTON.

Witnesses:
 ELIZABETH J. PRICE,
 SOPHIE C. GATZKE.